United States Patent [19]

Yamashita

[11] 4,305,209
[45] Dec. 15, 1981

[54] ADAPTOR

[75] Inventor: Tsunehisa Yamashita, Tullahoma, Tenn.

[73] Assignee: Precision International, Inc., Tullahoma, Tenn.

[21] Appl. No.: 38,054

[22] Filed: May 11, 1979

[51] Int. Cl.³ .......................... G01C 3/04; G01C 1/02
[52] U.S. Cl. .................................. 33/275 R; 33/284; 248/178
[58] Field of Search .......................... 356/3, 4, 5, 256; 248/176–178, 187; 33/275 R, 284

[56] References Cited

U.S. PATENT DOCUMENTS

| | | | |
|---|---|---|---|
| 3,823,313 | 7/1974 | Unema | 33/275 R X |
| 3,874,087 | 4/1975 | Nunlist | 33/275 R |
| 3,895,871 | 7/1975 | Stasser | 356/5 X |
| 4,171,907 | 10/1979 | Hill et al. | 33/284 X |

OTHER PUBLICATIONS

Brochure G1 311–*Wild Dl 3 Distomat.*
Brochure G1 324e–*Wild Dl 10 Distomat.*

*Primary Examiner*—F. L. Evans
*Attorney, Agent, or Firm*—Cushman, Darby & Cushman

[57] ABSTRACT

An adaptor for mounting one instrument, such as an electronic distance measuring device, atop another instrument, such as a telescope or theodolite, for movement together about a horizontal axis with a base member attached to the upper device and presenting two downwardly facing cam surfaces and support members engaging the cam surfaces for vertical movement against springs to counteract the forces produced by the upper instrument as it pivots.

11 Claims, 2 Drawing Figures

ADAPTOR

BACKGROUND AND SUMMARY OF THE INVENTION

The invention relates to an adaptor for mounting one instrument on another instrument so that both are pivotably movable together about a horizontal axis.

Often it is desirable to be able to mount one instrument atop another so that both can be used simultaneously. For example, electronic distance measuring devices are instruments which transmit a beam of light to a distant object, receive the reflected beam, and determine and display the distance to the object. Such devices are commonly used for surveying and it is convenient to use them in conjunction with conventional otpical devices such as telescopes and theodolites. Preferably, the electronic distance measuring device is mounted atop the optical instrument for pivotable movement therewith.

An instrument such as an electronic distance measuring device cannot simply be attached to a theodolite or the like because the balance of the two instruments together will be unsatisfactory. An adaptor must be used to attach the upper instrument to both the lower instrument and the stand and to provide compensating forces as the instruments are tilted.

One type of adaptor now in use for such systems utilizes three downwardly extending male members attached to the upper instrument which must be received in corresponding female portions in a lower member and engage springs which are horizontally compressed to produce compensating forces as the two instruments pivot together about a horizontal axis. The device must be locked in place and is unwieldy to assemble. In addition, some torque is produced by the device, and it is difficult to find springs which will compensate exactly for the forces produced by the pivoting motion of the upper instrument.

The present invention relates to an improved adaptor of the type which utilizes at least one and preferably two supporting members adapted to be coupled to the stand which supports the lower instrument for pivotable movement. Each of these supporting members engages a cam surface of the adaptor which is attached to the upper instrument. A compressible spring engages each of the support members and produces a force which varies as the support members engage different portions of the cam surface and move vertically in accordance therewith. No torque is produced and the supporting members ride on the cam surfaces rather than engage female or other portions thereof. The contour can be linear or nonlinear and can be specifically designed to exactly counteract the forces produced by any given upper instrument as it moves with the lower instrument about a horizontal axis.

Other objects and purposes of the invention will be clear from the following detailed description of the drawings.

DETAILED DESCRIPTION OF THE DRAWINGS

Figure 1:
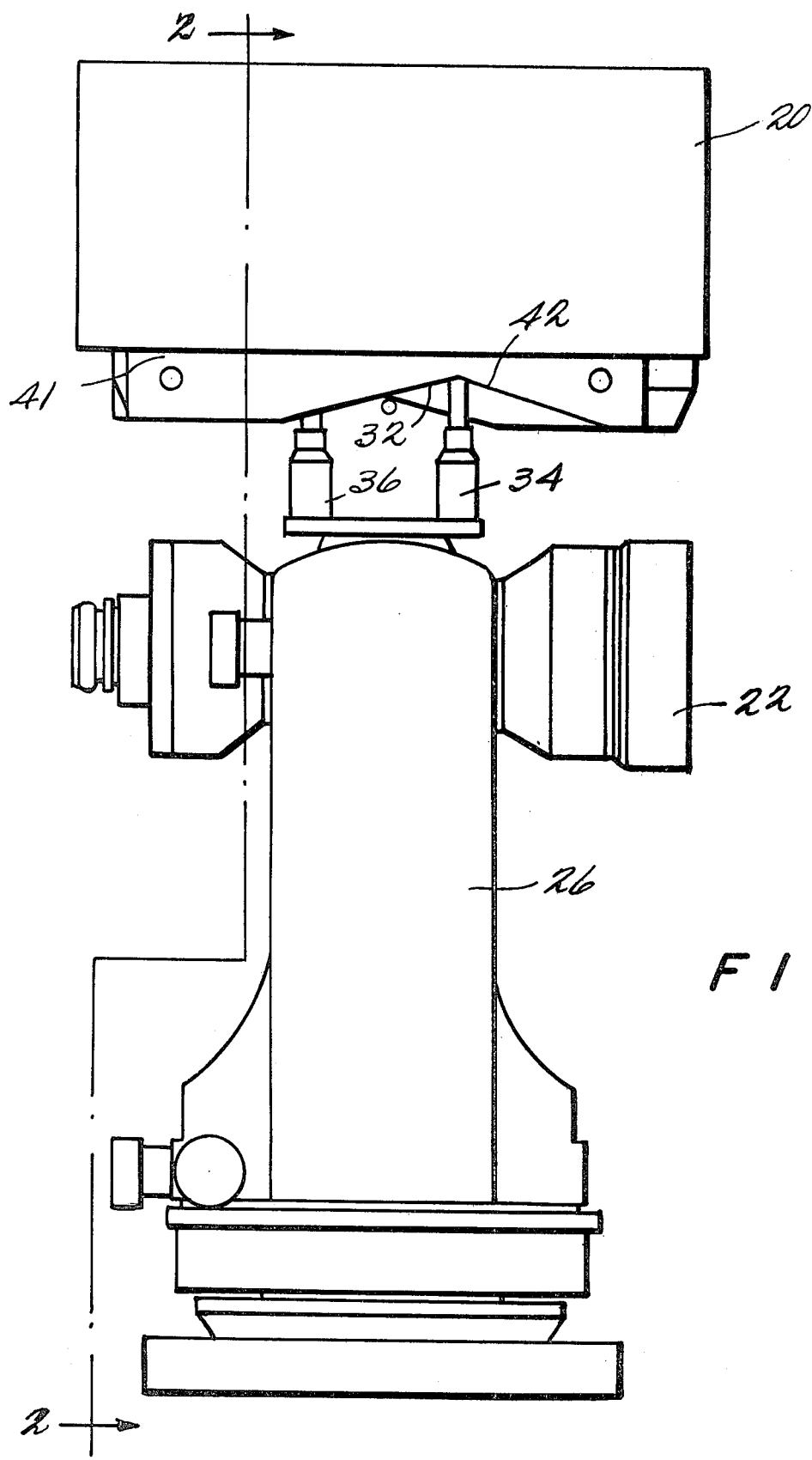
FIG. 1 shows a side view of one embodiment of the present invention.
Figure 2:
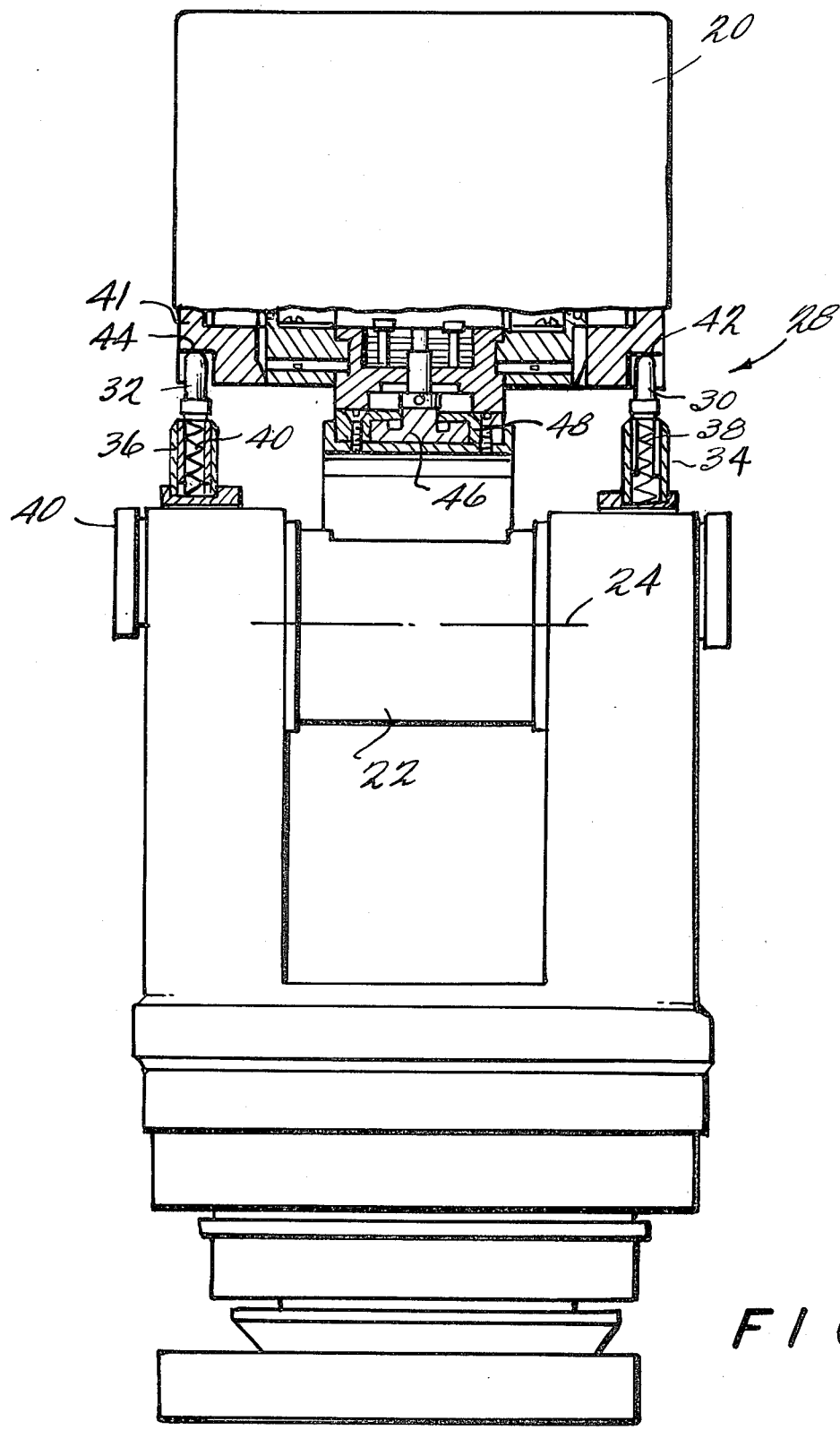
FIG. 2 shows a sectional view of the embodiment of FIG. 1 along the lines 2—2.

Reference is now made to FIGS. 1 and 2 which illustrate one embodiment of the present invention for coupling together an upper first instrument 20 and a lower second instrument 22. As described above, the invention finds particular utility with, but is not limited to, mounting an electronic distance measuring instrument above an optical instrument such as a telescope or theodolite. The lower instrument 22 is conventionally mounted for pivotable movement about an axis 24 with regard to a stationary stand 26. The adaptor 28 includes a pair of support members 30 and 32, which are mounted for vertical movement in and out of members 34 and 36, respectively, against the urging of springs 38 and 40. Members 34 and 36 are directly mounted on stand 26 and fixed with respect to instruments 20 and 22.

Adaptor 28 further includes a base member 41, which is connected on one side to the lower surface of instrument 20 and presents on the other side first and second cam surfaces 42 and 44 which respectively engage the rounded ends of members 30 and 32. These cam surfaces may be linear or non-linear, and are preferably shaped so that springs 38 and 40 exactly compensate for the vertical forces applied to members 30 and 32 by cam surface 42 and 44 as instrument 20 is pivoted about horizontal axis 24 together with the lower instrument 22.

Instruments 22 and 20 are rigidly connected together for pivotal movement about axis 24 by means of member 46 which slides in a track 48.

The adaptor can be made of any suitable material, preferably metal, and can be used for coupling together any instruments. Many changes and modifications in the above-described embodiment of the invention can, of course, be made without departing from the scope thereof. Accordingly, that scope is intended to be limited only by the scope of the appended claims.

What is claimed is:

1. An adaptor for mounting an instrument device on a stand and on a second instrument device for movement together with said second device comprising:

a base member for connection on one side to said first device and having at least one cam surface on the opposite side thereof; and supporting means for connection to said stand and to said devices for coupling said devices together for pivotable movement of said devices about a horizontal axis, including a support member for mounting on said stand, and engaging said cam surface for relative movement with respect thereto and vertical movement as said devices are pivoted, compressible spring means engaging said support member and for mounting on said stand for applying a vertical force thereto in opposition to the vertical force applied by said cam surface to said support member, said vertical force applied by said spring means varying to counteract the change in force applied by said cam surface as said device is pivoted, and means for mounting said spring means and support member.

2. An adaptor as in claim 1, wherein said cam surface is non-linear.

3. An adaptor as in claim 1, wherein said base member has two cam surfaces and wherein said supporting means includes first and second supporting members, each engaging one of said cam surfaces, first and second spring means and first and second mounting means.

4. An adaptor as in claim 3, wherein said supporting members are mounted on opposite sides of said horizontal axis about which said devices pivot and on opposite sides of a second horizontal axis perpendicular to said axis about which said devices pivot.

5. An adaptor as in claim 1, 2, 3, or 4, wherein the surface of said supporting member engaging said cam surface is rounded.

6. In combination:
a first instrument device;
a second instrument device;
a stand; and
means for mounting said instruments on said stand for pivotable movement together about a horizontal axis including an adaptor for mounting said first instrument device on said stand and on said second instrument device for movement together with said second device comprising:
  a base member for connection on one side to said first device and having at least one cam surface on the opposite side thereof; and
  supporting means for connection to said stand and to said devices for coupling said devices together for pivotable movement of said devices about a horizontal axis, including a support member mounted on said stand, and engaging said cam surface for relative movement with respect thereto and vertical movement as said devices are pivoted, compressible spring means mounted on said stand engaging said support member for applying a vertical force thereto in opposition to the vertical force applied by said cam surface to said support member, said vertical force applied by said spring means varying to counteract the change in force applied by said cam surface as said device is pivoted, and means for mounting said spring means and support member.

7. In combination as in claim 6, wherein said first instrument is an electronic distance measuring device and said second instrument is an optical device.

8. In combination as in claim 6, wherein said cam surface is non-linear.

9. In combination as in claim 6, wherein said base member has two cam surfaces and said supporting means includes first and second supporting members each enging one of said cam surfaces, first and second spring means, and first and second mounting means.

10. In combination as in claim 9, wherein said supporting members are mounted on opposite sides of said horizontal axis about which said devices pivot and on opposite sides of a second horizontal axis perpendicular to said axis about which said devices pivot.

11. In combination as in claim 10, wherein the surface of said supporting member engaging said cam surface is rounded.

* * * * *